United States Patent Office 3,408,412
Patented Oct. 29, 1968

3,408,412
METHOD OF PREPARING FLUOROBENZENES
William D. Blackley, Wappingers Falls, and William R. Siegart, Poughkeepsie, N.Y., assignors to Texaco Inc., New York, N.Y., a corporation of Delaware
No Drawing. Filed Sept. 15, 1966, Ser. No. 579,530
4 Claims. (Cl. 260—650)

ABSTRACT OF THE DISCLOSURE

A method of preparing a fluorobenzene of the empirical formula $C_6F_xCl_{6-x}$ where $x$ is an integer from 1 to 6 comprising contacting hexachlorobenzene with cesium fluoride, rubidium fluoride or potassium fluoride in the presence of chlorine and where the presence of water is less than 1 wt. percent based on said hexachlorobenzene.

---

This invention relates to a method of preparing fluorobenzenes. More particularly, it is directed to the preparation of hexafluorobenzene, perfluorochlorobenzene and mixtures thereof of the empirical formula $C_6F_xCl_{6-x}$ where $x$ is a whole integer of from 1 to 6 inclusively.

The hexafluorobenzene and perfluorochlorobenzene products of the method of the invention are useful as lubricants, lubricant additives, and gyrofluids. They are further useful as chemical intermediates in the preparation of pharmaceuticals, pesticides and dyes.

In the past, the hexafluorobenzenes were prepared by thermal reactions of low molecular weight fluorine-containing monomers such as $CBr_3F$ and $CHBr_2F$. Fluorine containing ethanes and ethylenes, such as $$CH_2FCl—CH_2FCl$$

and $CHFCl=CHFCl$ have also been employed. Although this past procedure produced the hexafluorobenzene, the yields were low.

Another past method for producing hexafluorobenzene and the contemplated perfluorochlorobenzenes called for reacting hexachlorobenzene with elemental fluorine, $CoF_3$ or $ClF_3$ to form the hexafluorocyclohexane, perfluorochlorocyclohexane and/or their cyclohexene counterparts and then dehalogenating perfluorocyclohexane, perfluorochlorocyclohexane and/or their cyclohexene counterparts to form the corresponding perfluorobenzene and perfluorochlorobenzene products. The primary drawback of this procedure, although giving excellent yields, is the high cost and hazardous nature of the fluorination reagents. Further, the procedure undesirably requires a number of steps including the reactivation of the spent $CoF_2$ to $CoF_3$ by fluorination.

We have discovered, and this constitutes our invention, a method of preparing in good yields the fluorobenzenes as defined utilizing a reduced number of steps and less costly reagents. More particularly, our invention comprises contacting hexachlorobenzene with an alkali metal fluoride selected from the group consisting of cesium fluoride, rubidium fluoride and potassium fluoride in the presence of chlorine. Advantageously, the reaction is conducted at a temperature between about 400 and 700° C. utilizing between about 0.1 and 5.0 mole percent chlorine based on the hexachlorobenzene reactant employed and a mole ratio of hexachlorobenzene to alkali metal fluoride of between about 1:6 and 1:24. The reaction is normally conducted for a period of between about 2 and 10 hours under autogeneous conditions but may be conducted at pressures ranging anywhere from subatmospheric to superatmospheric.

The fluorinated products are recovered by standard means such as extraction, distillation, chromatographic separations and combinations thereof.

Examples of the fluorobenzene products contemplated herein in addition to those specifically mentioned heretofore are 1,3,5 - trifluoro - 2,4,6 - trichlorobenzene; 3,5-difluoro - 1,2,4,6 - tetrachlorobenzene, 1-fluoro-2,3,4,5,6-pentachlorobenzene and isomers thereof.

One of the essential features in the method of the invention is the conducting of the reaction in the presence of chlorine. Chlorine promotes substantially better yields and further directs the reaction to produce the more highly fluorinated products. When closely related halogens such as bromine are substituted for chlorine, the yield is substantially reduced.

Further, it is to be noted the maintenance of the reaction in a substantially anhydrous condition is desirable since water in amount of above about 1.0 wt. percent based on the chlorinated benzene reactant appears to inhibit the reaction.

One theory of the mechanism of reaction is set forth below in the following equations with potassium fluoride as the fluoride reactant and 1-fluoro-2,3,4,5,6-pentachlorobenzene as the final product:

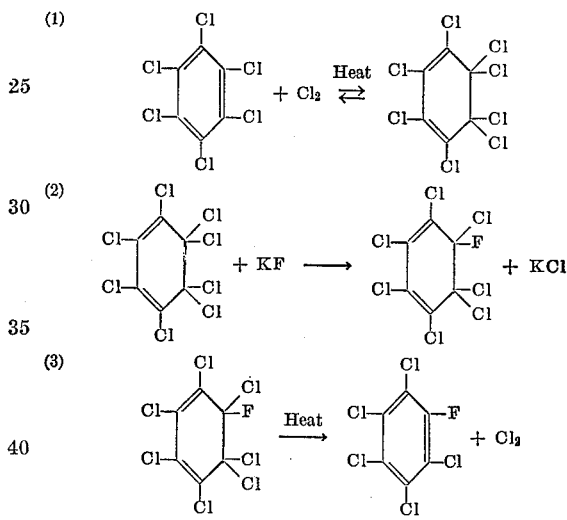

As can be seen the chlorine is believed to add to the hexachlorobenzene to form an intermediate chlorinated cyclic derivative which becomes reactive with the alkali metal fluoride and engages in an exchange reaction therewith to form fluorochlorocyclic intermediate which is then thermally decomposed into the perfluorobenzene or perfluorochlorobenzene products.

The subsequent examples further illustrate the invention but are not to be taken as limitations thereof.

In the following examples one of three procedures described below were employed:

PROCEDURE A

To a 75 cc. stainless steel cylinder there was charged hexachlorobenzene together with granular potassium fluoride. The cylinder was then evacuated, charged to atmospheric pressure with chlorine and then sealed. At the end of the reaction period the liquid and volatile products were removed by vacuum (2 mm. Hg). The products remaining in the reactor were extracted twice with 50 ccs. of ether, the ether was evaporated and residue extract product was set aside for later analysis. The remaining ether insoluble solids were then extracted with water at 80° C. and the water soluble and water insoluble portions were separately recovered. All separated products were then analyzed by nuclear magnetic resonance and infrared analysis.

PROCEDURE B

To a 350 cc. stainless steel reactor fitted with a valved outlet tube there was charged hexachlorobenzene and granular potassium fluoride. The potassium fluoride was generally charged first and the hexachlorobenzene subsequently added and the reactor sealed. The reactor was then evacuated and the catalyst introduced. The reactor was sealed and heated in a furnace. The volatile products were periodically removed from the reactor to prevent large build up of pressure. At the end of the reaction period the volatile products were removed from the reactor by distillation and the residual solids were then subjected to further separation with ether and water as described in Procedure A. The separated products were then analyzed by infrared and nuclear magnetic resonance techniques.

PROCEDURE C

To a 75 cc. Pyrex tube of the Carius type there was charged hexachlorobenzene and granular potassium fluoride and the desired amount of catalytic additives. After the additions of reactants and catalysts the glass ampoule was cooled in liquid nitrogen and sealed, then placed in a furnace and heated to the desired temperature for the desired period of time. At the end of the reaction period the liquid and volatile products were removed from the reaction mixture by pumping through a liquid nitrogen cold trap. The solid products remaining were subjected to further separation in the manner described in Procedure A and the separated products were analyzed by infrared and nuclear magnetic resonance techniques.

cept in Run 6 no chlorine was employed and in Run 7 where a mixture of iodine and nitrogen was substituted for chlorine. The test data and results are reported below:

| Description | Run No. | | |
|---|---|---|---|
| | 5 | 6 | 7 |
| Reactants and Cat., mole: | | | |
| $C_6Cl_6$ | 0.28 | 0.28 | .08. |
| KF | 2.6 | 2.6 | 1.72. |
| $Cl_2$ | .01 | 0 | $I_2$ (.004). $N_2$ (.014). |
| Reactant Conditions: | | | |
| Temp., °C | About 650 | About 650 | 500. |
| Time, hrs | 25 | 15 | 5. |
| Fluorobenzene Product: | | | |
| Yield, mole percent [1] | 76 | Trace | Trace. |
| Composition, (mole percent). | $C_6F_6$ (3.8) $C_6F_5Cl$ (19.2) $C_6F_4Cl_2$ (40.8) $C_6F_3Cl_3$ (33) $C_6F_2Cl_4$ (3) | | |

[1] Based on $C_6Cl_6$.

Example III

This example still further illustrates the method of the invention and the importance of maintaining the reaction in the presence of chlorine.

The procedure employed was Procedure C which has been previously described except in Runs 10 and 11 no chlorine was employed and in Run 12 bromine was substituted for chlorine. The test data and results are reported below:

| Description | Run No. | | | | |
|---|---|---|---|---|---|
| | 8 | 9 | 10 | 11 | 12 |
| Reactants and Cat., mole: | | | | | |
| $C_6Cl_6$ | .0175 | .0175 | .0175 | .0175 | .0175. |
| KF | 0.43 | 0.43 | 0.43 | 0.43 | 0.26 |
| $Cl_2$ | .003 | .003 | None | None | $Br_2$ (0.5 cc.). |
| React. Conditions: | | | | | |
| Temp., °C | 500 | 500 | 500 | 500 | 500. |
| Time, Hrs | 4 | 7 | 4 | 7 | 5. |
| Fluorobenzene Product: | | | | | |
| Yield, mole percent [1] | 36.7 | 48.8 | 0 | 0 | 0. |
| Composition (mole percent) | $C_6F_6$ (2.2) $C_6F_5Cl$ (16.6) $C_6F_4Cl_2$ (21.8) $C_6F_3Cl_3$ (40.3) $C_6F_2Cl_4$ (16.6) $C_6FCl_5$ (3.5) | $C_6F_6$ (trace) $C_6F_5Cl$ (11.7) $C_6F_4Cl_2$ (32.6) $C_6F_3Cl_3$ (46) $C_6F_2Cl_4$ (9) | | | |

[1] Based on $C_6Cl_6$.

Example I

This example illustrates the method of the invention and further the importance of the presence of chlorine in the reaction.

The procedure employed was Procedure A described above except in Runs 3 and 4 no chlorine was employed. The particular reactant and catalyst quantities in reaction conditions together with analysis of the final products are reported below:

| Description | Run No. | | | |
|---|---|---|---|---|
| | 1 | 2 | 3 | 4 |
| Reactants and Catalyst, mole: | | | | |
| $C_6Cl_6$ | .0175 | .0175 | .0175 | .0175. |
| KF | 0.43 | 0.43 | 0.215 | 0.52. |
| $Cl_2$ | .003 | .003 | 0 | 0. |
| Reactant Conditions: | | | | |
| Temp., °C | About 650 | About 650 | About 650 | About 650. |
| Time, hrs | 3 | 4 | ~8 | 9. |
| Fluorobenzene Product: | | | | |
| Yield, mole percent [1] | 44.9 | 57.2 | 0 | 0. |
| Composition, mole percent | $C_6F_6$ (65) $C_6F_5Cl$ (35) | $C_6F_6$ (43) $C_6F_5Cl$ (57) | | |

[1] Based on charge $C_6Cl_6$.

Example II

This example further illustrates the method of the invention and the importance of the presence of chlorine.

Procedure B precedingly described was employed ex-

We claim:

1. A method of preparing a fluorobenzene of the empirical formula $C_6F_xCl_{6-x}$ where $x$ is an integer from 1 to 6 comprising contacting at a temperature between about 400 and 700° C. under autogeneous pressure hexachlorobenzene with alkali metal fluoride in a mole ratio of said hexachlorobenzene to said fluoride of between about 1:6 and 1:24 in the presence of between about 0.1 and 5 mole percent chlorine based on said hexachlorobenzene and where the presence of water is less than about 1 wt. percent based on said hexachlorobenzene, said alkali metal fluoride being selected from the group consisting of cesium fluoride, rubidium fluoride and potassium fluoride.

2. A method in accordance with claim 1 wherein said alkali metal fluoride is potassium fluoride.

3. A method in accordance with claim 1 wherein said alkali metal fluoride is cesium fluoride.

4. A method in accordance with claim 1 wherein said alkali metal fluoride is rubidium fluoride.

References Cited

UNITED STATES PATENTS 3,300,537   1/1967   Bennett et al. -------- 260—650

DANIEL D. HORWITZ, *Primary Examiner.*